US008919538B2

(12) United States Patent
Tout

(10) Patent No.: US 8,919,538 B2
(45) Date of Patent: Dec. 30, 2014

(54) ARMORED FACE CONVEYOR

(75) Inventor: John Tout, Worcester (GB)

(73) Assignee: Joy MM Delaware, Inc., Wilmington, DE (US)

( * ) Notice: Subject to any disclaimer, the term of this patent is extended or adjusted under 35 U.S.C. 154(b) by 195 days.

(21) Appl. No.: 13/396,773

(22) Filed: Feb. 15, 2012

(65) Prior Publication Data

US 2013/0207443 A1 Aug. 15, 2013

(51) Int. Cl.
B65G 19/28 (2006.01)

(52) U.S. Cl.
USPC ........... 198/735.1; 198/727; 198/729; 299/43

(58) Field of Classification Search
USPC ........... 198/727, 729, 735.1; 299/34.1, 43, 64
See application file for complete search history.

(56) References Cited

U.S. PATENT DOCUMENTS

| | | | |
|---|---|---|---|
| 4,079,833 A * | 3/1978 | Rollins | 198/731 |
| 4,373,757 A * | 2/1983 | Gehle et al. | 299/43 |
| 4,815,586 A * | 3/1989 | Heising | 198/727 |
| 5,131,724 A * | 7/1992 | Bandy et al. | 299/43 |
| 5,134,738 A * | 8/1992 | Hatfield | 5/625 |
| 5,272,289 A * | 12/1993 | Cocksedge et al. | 198/735.1 |
| 5,601,341 A * | 2/1997 | Merten et al. | 299/43 |
| 5,938,000 A * | 8/1999 | Fischer et al. | 198/735.4 |
| 6,179,386 B1 * | 1/2001 | Meya et al. | 299/43 |
| 6,401,912 B1 * | 6/2002 | Bandy, Jr. | 198/735.4 |
| 6,595,351 B2 * | 7/2003 | Malitzki | 198/731 |
| 7,325,670 B2 * | 2/2008 | Vorsteher et al. | 198/735.2 |
| 7,399,039 B2 * | 7/2008 | Bettermann et al. | 299/34.1 |

FOREIGN PATENT DOCUMENTS

| | | |
|---|---|---|
| GB | 1350262 | 4/1974 |
| GB | 2047191 | 11/1980 |
| GB | 2100695 | 1/1983 |
| GB | 2186856 | 8/1987 |
| GB | 2333306 | 7/1999 |
| PL | 168390 | 2/1996 |

OTHER PUBLICATIONS

Search Report from the Polish Patent Office for Application No. P-398145 dated Jul. 12, 2012 (2 pages).
"Rozwoj techniki urabiania w gornietwie weglowym-urabianie kombajnami," Wrodaw, 2010, pp. 102-110, Retrieved from Internet Aug. 30, 2012 <URL: http://www.historia-gornictwa.pwr.wroc.pl/wp-content/uploads/10Gierlotka.pdf> (Statement of Relevance attached).

(Continued)

Primary Examiner — Douglas Hess
(74) Attorney, Agent, or Firm — Michael Best & Friedrich LLP

(57) ABSTRACT

An armored face conveyor includes a plurality of line pans positioned adjacent to one another, a plurality of flight bars, and a connecting member. Each line pan includes a race having an outer race face and an inner race face. The plurality of flight bars extend laterally across the line pans and are received by the race. Each flight bar includes an end having an upper guide surface and a lower guide surface. The connecting member extends through the plurality of flight-bars and couples the flight-bars to one another. Lateral movement of any one of the flight-bars that causes the upper guide surface to contact the outer race face substantially simultaneously causes the lower guide surface to contact the inner race face.

17 Claims, 4 Drawing Sheets

(56) References Cited

OTHER PUBLICATIONS

Search Report from the United Kingdom Intellectual Property Office for Application No. 1202696.9 dated Jun. 27, 2012 (4 pages).
Patent Examination Report No. 1 from the Australian Government IP Australia for Application No. 2012200937 dated Mar. 18, 2014 (5 pages).
J. Antoniak, J. Suchofi, Polish publication "Górnicze Przenośniki Zgrzeb•owe" ("Mining Scraper Conveyors") published in Katowice, Poland, 1983, ISBN 83-216-0362-9 (pp. 296, 299, 302).
Polish publication "Poradnik Górnika" ("Miner Guidebook"), vol. 2, published in Katowice, Poland, 1974-1975 (p. 1072).

* cited by examiner

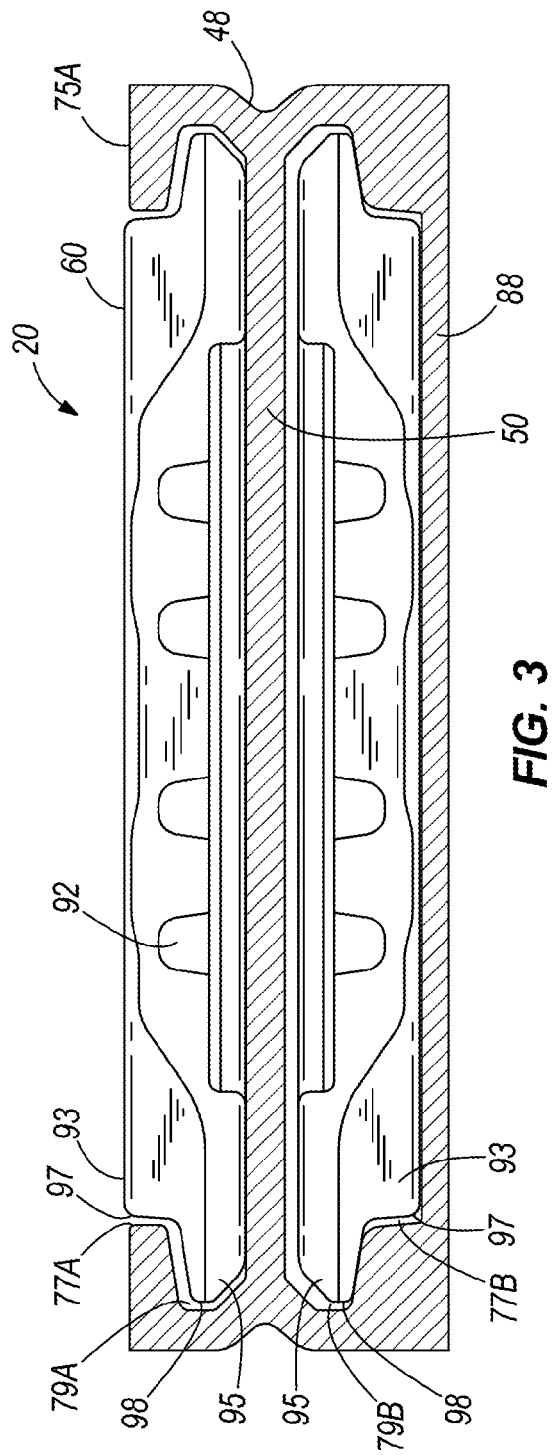
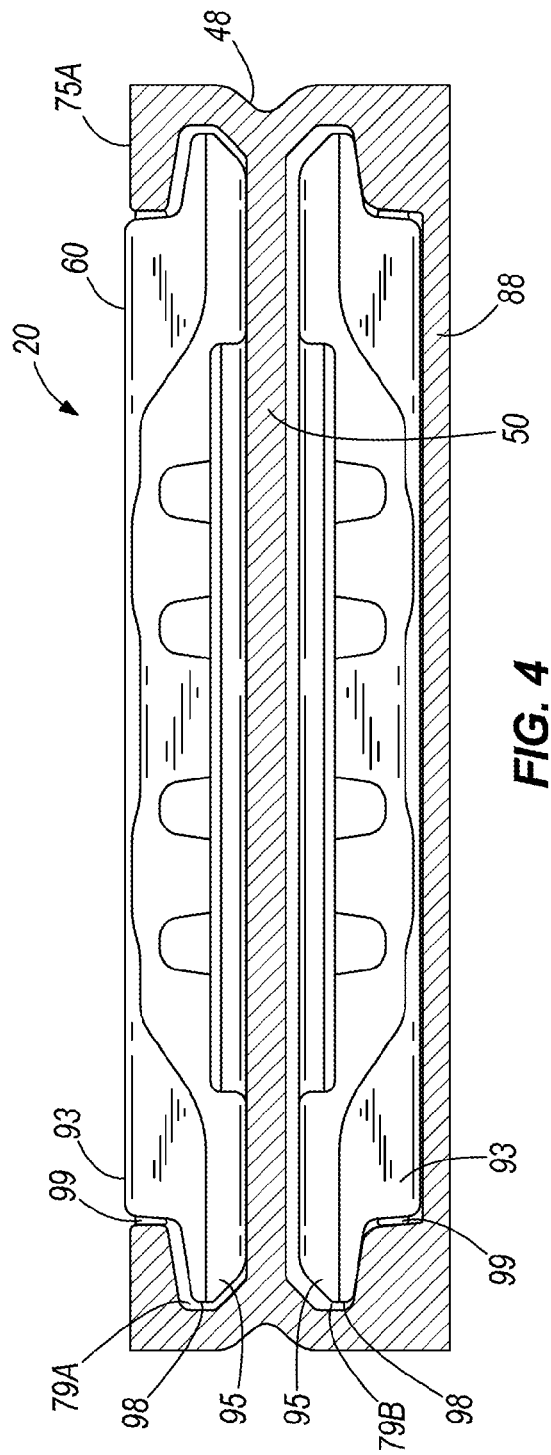

ARMORED FACE CONVEYOR

FIELD OF INVENTION

The invention relates to face conveyors for underground longwall mining.

BACKGROUND OF INVENTION

Longwall mining is a form of underground mining where a long wall of material (e.g., coal) is mined in a single slice (e.g., 1-2 meters thick). The longwall panel (i.e., the block of material that is being mined) can vary in its size but it can be up to 3-4 km long and 250-400 meters wide. Armoured face conveyors are part of an integrated longwall material extraction system that also includes, among other elements, a material-cutting machine (e.g., a shearer) and a support structure (e.g., roof support, etc.). The face conveyor is used to collect and drag the removed material to another conveyor or a different location.

SUMMARY OF INVENTION

In one embodiment, the invention provides a material extraction system for an underground mine. The system includes a material-cutting machine and a face conveyor for transporting material cut by the material-cutting machine. The face conveyor includes a plurality of line pans positioned adjacent to one another, with each line pan including a race having an outer race face and an inner race face. The face conveyor also includes a plurality of flight-bars that extend laterally across the line pans and that are received by the race. Each flight bar includes an end having an upper guide surface facing the outer race face and a lower guide surface facing the inner race face. The face conveyor also includes a connecting member extending through the plurality of flight-bars and coupling the flight-bars to one another. Lateral movement of any one of the flight-bars that causes the upper guide surface to contact the outer race face substantially simultaneously causes the lower guide surface to contact the inner race face.

In another embodiment, the invention provides a face conveyor for removing material in an underground mine. The face conveyor includes a plurality of line pans positioned adjacent to one another, a plurality of flight bars, and a connecting member. Each line pan includes a race having an outer race face and an inner race face. The plurality of flight bars extend laterally across the line pans and are received by the race. Each flight bar includes an end having an upper guide surface and a lower guide surface. The connecting member extends through the plurality of flight-bars and couples the flight-bars to one another. Lateral movement of any one of the flight-bars that causes the upper guide surface to contact the outer race face substantially simultaneously causes the lower guide surface to contact the inner race face.

In yet another embodiment, the invention provides a line pan assembly for a mining face conveyor. The assembly includes a line pan including a race having an outer race face and an inner race face, and at least one flight bar extending laterally across the line pan and received by the race. The flight bar is moveable laterally within the race and includes an end having an upper guide surface facing the outer race face and a lower guide surface facing the inner race face. Lateral movement of the flight bar that causes the upper guide surface to contact the outer race face substantially simultaneously causes the lower guide surface to contact the inner race face.

Other aspects of the invention will become apparent by consideration of the detailed description and accompanying drawings.

BRIEF DESCRIPTION OF THE DRAWINGS

FIG. 3 is a cross-section view of the face conveyor shown in FIG. 2.

FIG. 4 is cross-section view of another embodiment of the face conveyor shown in FIG. 2.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
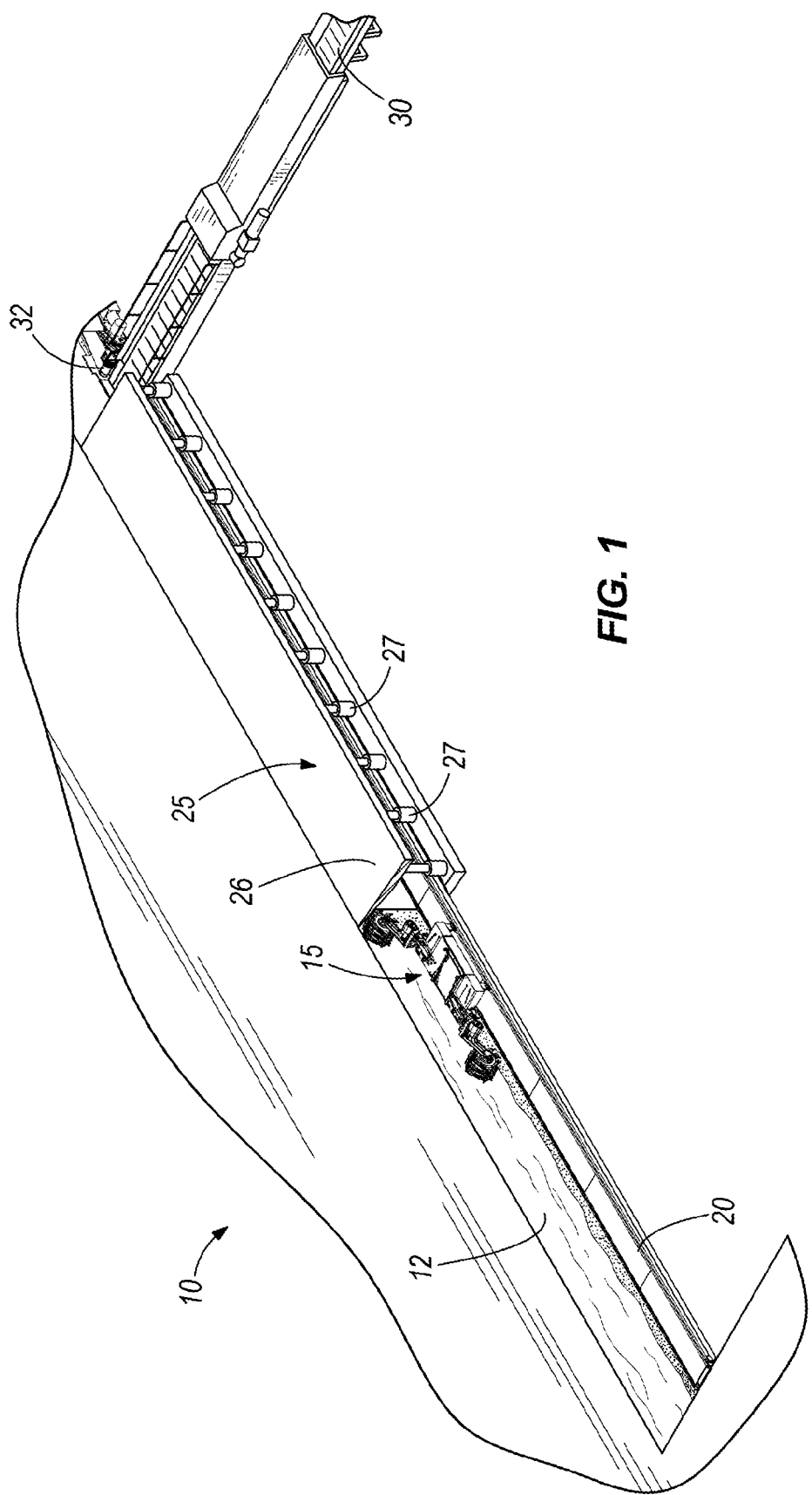
FIG. 1 is a perspective view of an underground material extraction system according to an embodiment of the invention.

FIG. 1 is a perspective view of an underground material extraction system 10 according to an embodiment of the invention. The material extraction system 10 removes material from the ground (i.e., a mining face 12). The system 10 includes a continuous material-cutting mining machine 15 (e.g., a longwall shearer) that moves in a lateral direction substantially parallel to the mining face 12. The shearer 15 is mounted on an armoured face conveyor 20 positioned below and behind the material-cutting machine 15 and extending substantially parallel to the mining face 12. The material extraction system 10 further includes a roof support structure 25 that provides structural support to the system 10. In some embodiments, the support structure 25 includes a number of roof supports 26 that extend forwardly from respective support jacks 27. The roof supports 26 and supports jacks 27 extend in a line parallel to the mining face 12 and advance forwardly with the shearer 15 and face conveyor 20 as material is removed from the mining face 12.

In some embodiments, the material extraction system 10 can include a discharge conveyor 30 oriented substantially normal to and extending away from the mining face 12. A loading machine (not shown) can also be provided for removing the material from the conveyors and transferring the material removed from the conveyors 20 and 30 to crushers, sizers, or other processing equipment. The discharge conveyor 30 can be connected to the face conveyor 20 so the material moved by the face conveyor 20 is easily transferred to the discharge conveyor 30. For example, the face conveyor 20 can include a discharge portion 32 usually at one end that can be operated to deposit material removed from the mining face 12 onto the discharge conveyor 30. The face conveyor 20 and the discharge conveyor 30 can be operably driven by the drive system of the shearer 15 or may include their own independent drive systems, either of which may be electric and/or hydraulic in nature.

The longwall shearer 15 includes a generally rectangular chassis 35 and a pair of articulating arms 38, each of which supports a cutter assembly 40. The arms 38 are pivotally coupled to opposite ends of the chassis 35 and are pivoted by actuators (not shown) coupled between the arms 38 and the chassis 35. Each arm 38 supports a cutter motor (not shown) operable to rotatably drive cutter assembly 40. The cutter assembly 40 includes a cutting surface (not shown) for removing material from the mining face 12 when the longwall shearer 15 moves substantially parallel to the mining face 12. The material removed by the shearer 15 is collected by the face conveyor 20. The face conveyor 20 carries the material toward the discharge portion 32, which deposits the material onto the discharge conveyor 30. The discharge conveyor 30 then carries the material away from the mining area for further processing. Material is thus continuously removed from the mining face 12 and conveyed from the shearer 15, to the face conveyor 20, to the discharge portion 32, and then away from the mining area via the discharge conveyor 30. In certain embodiments, the entire operation is automated and/or controlled via operators located away from the mining area.

Figure 2:
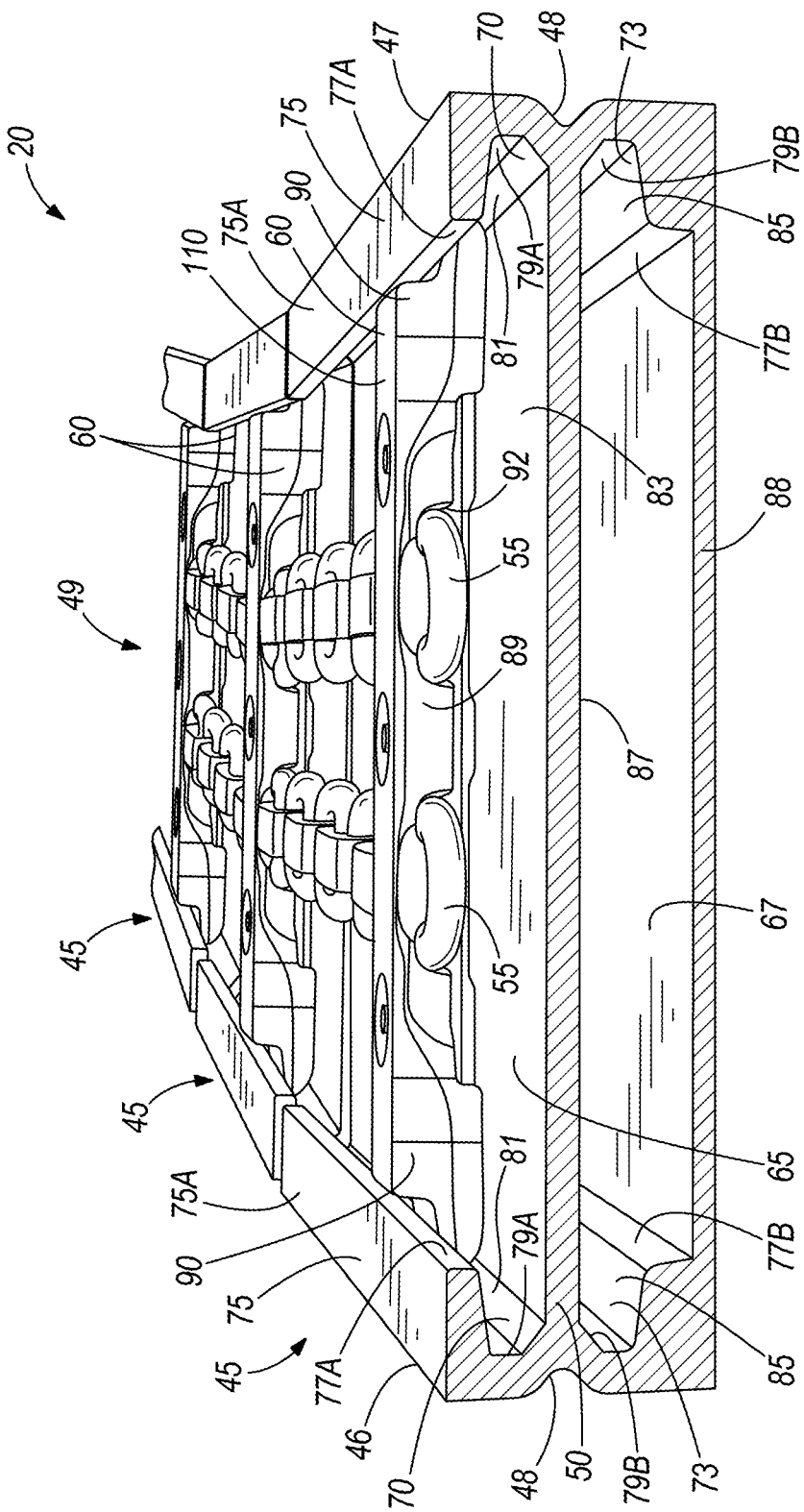
FIG. 2 is a perspective view of a face conveyor of the material extraction system of FIG. 1 according to an embodiment of the invention.

FIG. 2 is a perspective view of the face conveyor 20 included in the material extraction system 10. The face conveyor 20 comprises a plurality of conveyor sections or line pans 45, and haulage assembly 49 including connecting members in the form of chains 55 and flight-bars 60 connected by the chains 55. The haulage assembly 49 extends along the line pans 45. In the illustrated embodiment, the conveyor 20 includes two connecting members 55. In other embodiments, the conveyor 20 can include one connecting member 55 or can include three or more connecting members, depending on the application. In alternative embodiments, the connecting member 55 can be or include a belt, a strap, or any other suitable means for moving the flight-bars 60 along the line pans 45. The total length of the face conveyor 20 depends upon how many line pans 45 are used.

The line pans 45 are positioned adjacent to one another and extend along the mining face 12. In the illustrated embodiment the line pans 45 are generally constructed from one piece of material that defines two side rails 48 connected by a central plate 50 that extends between the side rails 48. The side rails 48 define opposite line pan sides 46 and 47. In another embodiment, the line pans can be constructed from several pieces of material that are connected to one another via welding or any other sufficient mechanism of connection.

The line pan 45 includes an upper channel 83 and a lower channel 87, and supports the haulage assembly 49. The upper channel 83 receives and supports the advancing run of the haulage assembly 49 and the lower channel 87 receives and supports the return run of the haulage assembly 49. The side rails 48 define inwardly-facing top race portions 70 positioned at the outboard ends of the upper channel 83 and inwardly-facing bottom race portions 73 positioned at the outboard ends of the lower channel 87. The race portions 70, 73 guide the haulage assembly 49 as it moves along the line pans 45 during operation. More specifically, the haulage assembly 49 is first driven along the upper channel 83 and guided by the top race portions 70 until reaching the end of the face conveyor 20. The haulage assembly 79 then transitions from the upper channel 83 into the lower channel 87 and is guided back to the opposite end of the face conveyor 20 by the bottom race portion 73. The haulage assembly 49 is driven by drive assemblies (not shown) positioned at each end of the face conveyor 20. In some embodiments, the drive assemblies include sprockets, but other types of drive assemblies can also be used.

The top race portion 70 of the line pan 45 includes an extended portion 75 defining a top face 75A, a bottom face 75B (not shown), and a substantially vertical outer race face 77A. The top race portion 70 further includes a substantially vertical inner race face 79A positioned below the top portion 75 and parallel to the outer race face 77A, and a lower face 81 positioned at an angle in relation to the outer race face 77A. The top race portion 70 is completed by the upper section 83 of the plate 50. As illustrated in FIG. 2-4, the elements of the top race portion 70 are present in both top race portions 70 of the line pan 45.

The bottom race portion 73 of the line pan 45 includes a substantially vertical outer race face 77B parallel to the outer race face 77A of the top race portion 70, a substantially horizontal face 85 extending between the outer race face 77B and a substantially vertical inner race face 79B that is parallel to the inner race face 79A of the top race portion 70. The bottom race portion 73 is completed by the lower section 87 of the plate 50 and a bottom support section 88 parallel to the plate 50. As shown in FIG. 2-4, the elements of the bottom race portion 73 are present in both bottom race portions 73 of the line pan 45.

The plurality of elongated flight-bars 60 extend between both ends 46 and 47 of the line pans 45. The connecting members 55 extend through the plurality flight-bars 60 and couple the flight-bars 60 to one another. In the lustrated embodiment, the connecting member includes two continuous chains 55. The flight-bars 60 include a body 89 defining two spaced apart ends 90. The body 89 of the flight-bar 60 includes at least one opening 92 used to engage the continuous chain 55.

As best shown in FIGS. 3 and 4, the ends 90 of the flight-bar 60 each include a top shoulder 93 and a bottom shoulder 95 extending from the top shoulder 93 in a direction towards the side rails 48 of the line pans 45. The top shoulders 93 each define a first or upper guide surface 97 and the bottom shoulders 95 each define a second or lower guide surface 98. When the flight-bars 60 are positioned in the top race portion 70, the upper guide surfaces 97 each face a respective one of the outer race faces 77A and the lower guide surfaces 98 each face a respective one of the inner race faces 79A. When the flight-bars 60 are positioned in the bottom race portion 73, the upper guide surfaces 97 each face a respective one of the outer race faces 77B and the lower guide surfaces 98 each face a respective one of the inner race faces 79B.

The geometries of the flight-bars 60, the top race portion 70, and the bottom race portion 73 are such that, regardless of whether the flight-bars 60 are in the top race portion 70 or the bottom race portion 73, for each end of the flight-bars 60 the distance between the upper guide surface 97 and its respective outer race face 77A or 77B is substantially the same as the distance between the lower guide surface 98 and its respective inner race face 79A or 79B. In this way, when the flight-bars 60 shift laterally during operation, if the upper guide surfaces 97 come into contact with the outer race face 77A or 77B, the lower guide surfaces 97 substantially simultaneously come into contact with the inner race face 79A or 79B. Because there are two contact surfaces, wear on the flight-bars 60 and on the line pans 45 is reduced. When a flight-bar 60 is centered in the top race portion 70, the distances between the upper guide surfaces 97 on each end of the flight-bar 60 and their respective outer race faces 77A are substantially the same, and the distances between the lower guide surfaces 98 on each end of the flight-bar 60 and their respective inner race faces 79A are also substantially the same, and are substantially the same as the distances between the upper guide surfaces 97 and the outer race faces 77A. The situation is the same when the flight-bar 60 is centered in the bottom race portion 73.

Figure 5:
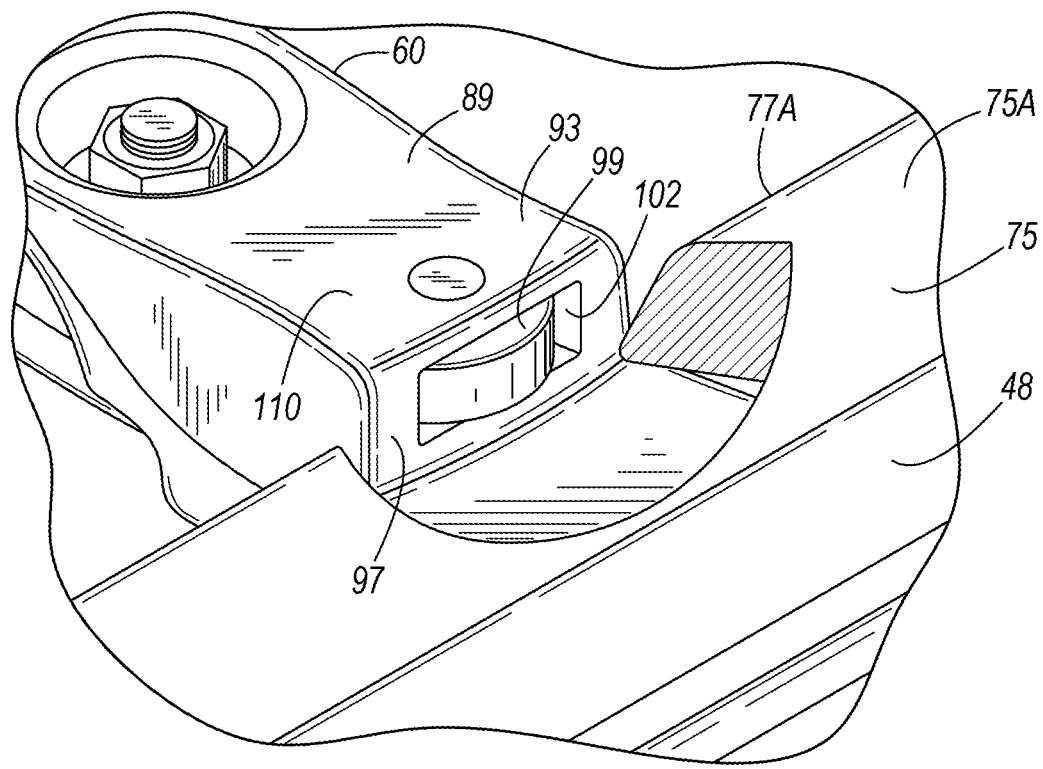
FIG. 5 is a perspective view of a portion of a flight-bar included in the face conveyor of FIG. 2.
Figure 6:
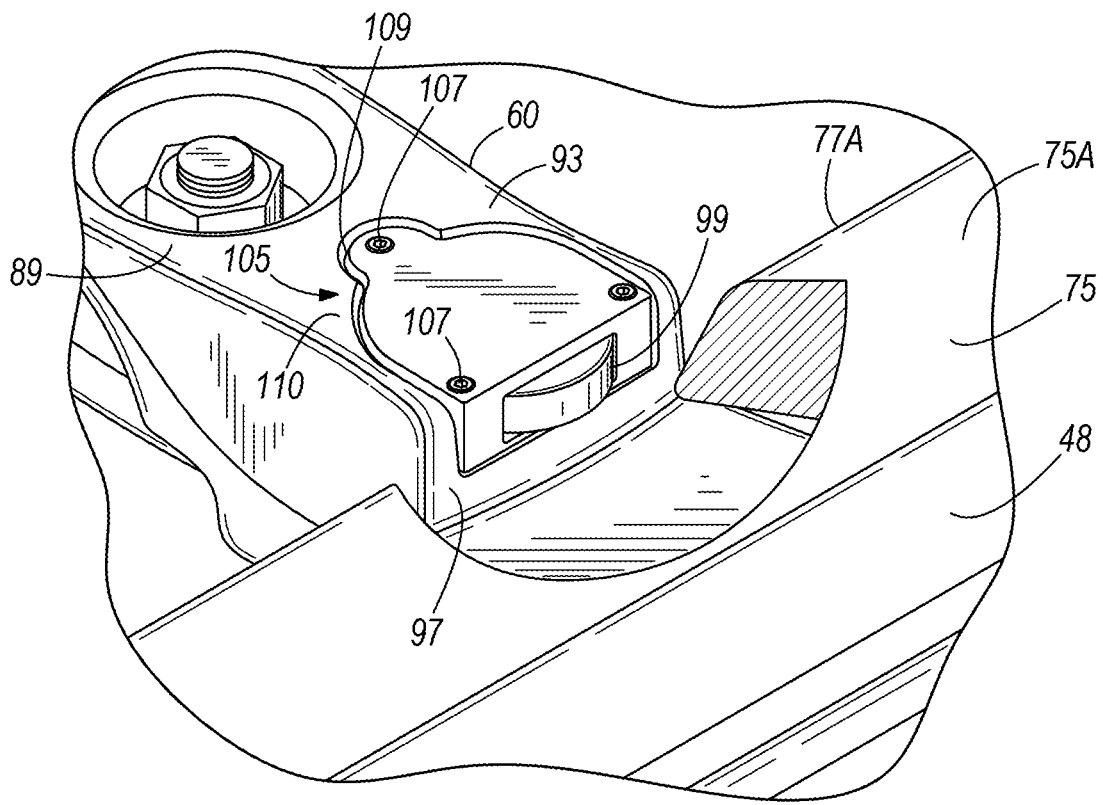
FIG. 6 is a perspective view of a portion of another embodiment of the flight-bar included in the face conveyor of FIG. 2.

As illustrated in FIGS. 4-6, in some embodiments, the top shoulder 93 of the flight-bar 60 further includes a low friction guidance system operable to guide the flight-bars along the outer race face 77A or 77B of the line pan. For example, the guidance system can comprise a roller 99 mounted on the first vertical portion 97 of the top shoulder 93, the roller contacting the outer race face 77A or 77B of the line pan 45.

The material removed with the shearer 15 drops on the top of the moving face conveyor 20. Each line pan 45 of the face conveyor 20 supports, captivates, and guides the flight-bars 60 and consequently the continuous chains 55 along a line parallel to the sides 46 and 47 of the line pans 45. Specifically, the guidance and captivation capability of the flight-bars 60 and chains 55 in the conveyor 20 is provided by the improved construction of the top race portion 70 and the bottom race portion 73 of the line pans 45 (also called a sigma profile of the line pan) and the configuration of the shoulders 93 and 95 of the flight-bar 60. As illustrated in FIGS. 2-4, the present construction allows the first vertical portions 97 of the top shoulders 93 to align with the outer race faces 77A and 77B of the line pan 45, and the second vertical portions 98 of the bottom shoulders 95 to align with the inner race faces 79A and 79B of the line pan 45. Therefore, the outer race faces 77 and the inner race faces 79 of the line pans 45 are configured to keep the flight-bars 60 in a central position in relation to the line pans.

As the flight-bars 60 move along the line pans 45, they are guided by the described configuration that improves the traction and the support of the flight-bars 45 and continuous chain 55 assembly. As shown in FIG. 3, while moving within the plate portion 65, the flight-bars 60 rest on the upper section 83 of the plate 50 and move by utilizing the alignment between the first vertical portions 97 and the outer race faces 77A, and the alignment between the second vertical portions 98 and the inner race faces 79A of the line pan 45. Additionally, similar alignment between the vertical portions 97 and 98 of the flight-bar and the race faces 77B and 79B is utilized while the flight-bars 60 move within the channel portion 67 of the line pan 45.

Consequently, to allow for secured but unrestricted movement of the flight-bars 60, the first and the second vertical portions 97 and 98 are not firmly connected to the outer race faces 77A/77B and the inner race faces 79A/79B. The increased number of vertical faces 77 and 79 of the line pan 45 decreases the force applied to each vertical face 77 and 79 while guiding the flight-bars 60 along the line pan 45. Therefore, the amount of wear on the line pan 45 and the flight-bars shoulders 93 and 95 is reduced. Further, this configuration allows using a smaller sigma profile for the line pan 45, both in vertical and horizontal directions.

FIGS. 4-6 illustrate an embodiment of the material extraction system 10 in which the top shoulder 93 of the flight-bar 60 includes a roller 99 that extends outwardly from the edge of the top shoulder 93 towards the side rail 48 of the line pan 45. In particular, the roller 99 is mounted on the first vertical portion 97 of the top shoulder 93 and contacts the outer race faces 77A and 77B of the line pan 45. As the flight-bar 60 moves along the top race portion 70 or the bottom race portion 73 of the line pan 45, the roller 99 rotates along the outer race faces 77A or 77B.

In some embodiments, the roller 99 comprises an independent element that is mechanically integrated in an opening 102 of the first vertical portion 97 of the flight-bar 60 (see FIG. 5). In these embodiments, the roller 99 can be removed and/or replaced through the opening 102 of the flight-bar 60. In alternative embodiments (FIG. 6), the flight-bar 60 includes a roller assembly 105 that is connected to the flight-bar 60 via fasteners 107 (e.g., screws). The roller assembly 105 is positioned in an opening 109 defined by the top portion 110 of the top shoulder 93. In these embodiments, the roller 99 is removed and/or replaced by removing the entire roller assembly 105. Other configurations or mechanisms for connecting the roller 99 to the top shoulder 93 of the flight-bar 60 are also possible.

What is claimed is:

1. A material extraction system for an underground mine, the system comprising:
 a material-cutting machine; and
 a face conveyor for transporting material cut by the material-cutting machine, the face conveyor including:
  a plurality of line pans positioned adjacent to one another, each line pan including a race having an outer race face and an inner race face,
  a plurality of flight-bars extending laterally across the line pans and received by the race, each flight bar including an end having an upper guide surface facing the outer race face and a lower guide surface facing the inner race face, and
  a connecting member extending through the plurality of flight-bars and coupling the flight-bars to one another,
 wherein lateral movement of any one of the flight-bars causing the upper guide surface to contact the outer race face substantially simultaneously causes the lower guide surface to contact the inner race face,
 wherein the flight-bars further include a low friction guidance system for guiding the flight-bars along the outer race face of the line pan, and
 wherein the guidance system comprises a roller extending outwardly from the upper guide surface and contacting the outer race face of the line pan.

2. The system of claim 1, wherein the line pan further includes a plate extending between the sides of the line pan and separating the race into a top race portion and a bottom race portion.

3. The system of claim 1, wherein the connecting member and the flight-bars are driven by a drive assembly positioned at one end of the face conveyor.

4. The system of claim 1, wherein the upper guide surface of each flight-bar is spaced a lateral distance from the outer race face, and the lower guide surface of each flight-bar is spaced substantially the same lateral distance from the inner race face.

5. The system of claim 1, wherein the outer race face and the inner race face of the line pans are configured to keep the flight-bars in a central position in relation to the line pans.

6. The system of claim 1, wherein the flight-bars and the connecting member define a top face of the face conveyor and wherein the material is moved along a top face of the face conveyor.

7. The system of claim 1, wherein the material extraction machine is supported by and moves along the plurality of line pans.

8. The system of claim 1, wherein the connecting member comprises a continuous chain.

9. The system of claim 1, wherein the outer race face and the inner race face are substantially parallel to one another.

10. The system of claim 1, wherein the outer race face and the inner race face are substantially vertical.

11. A face conveyor for removing material in an underground mine, the face conveyor comprising:
- a plurality of line pans positioned adjacent to one another, each line pan including a race having an outer race face and an inner race face;
- a plurality of flight-bars extending laterally across the line pans and received by the race, each flight bar including an end having an upper guide surface and a lower guide surface; and
- a connecting member extending through the plurality of flight-bars and coupling the flight-bars to one another, wherein lateral movement of any one of the flight-bars causing the upper guide surface to contact the outer race face substantially simultaneously causes the lower guide surface to contact the inner race face,
- wherein the flight-bars further include a low friction guidance system for guiding the flight-bars along the outer race face of the line pan, and
- wherein the guidance system comprises a roller extending outwardly from the upper guide surface and contacting the outer race face of the line pan.

12. The system of claim 11, wherein the line pan further includes a plate extending between the sides of the line pan and separating the race into a top race portion and a bottom race portion.

13. The system of claim 11, wherein the connecting member and the flight-bars are driven by a drive assembly positioned at one end of the face conveyor.

14. The system of claim 11, wherein the outer race face and the inner race face of the line pans are configured to keep the flight-bars in a central position in relation to the line pans.

15. The system of claim 11, wherein the upper guide surface is spaced a lateral distance from the outer race face, and the lower guide surface is spaced substantially the same lateral distance from the inner race face.

16. The system of claim 11, wherein the outer race face and the inner race face are substantially parallel to one another.

17. The system of claim 11, wherein the outer race face and the inner race face are substantially vertical.

* * * * *